(12) United States Patent
Watanabe

(10) Patent No.: US 11,218,619 B2
(45) Date of Patent: Jan. 4, 2022

(54) IMAGE CAPTURING APPARATUS, METHOD FOR THE SAME, AND STORAGE MEDIUM WHERE WHILE AN IMAGE SENSOR IS LOCATED IN AN AREA AN OPTICAL MEMBER AND A VIBRATION TRANSMISSION MEMBER ARE NOT IN CONTACT WITH EACH OTHER

(71) Applicant: CANON KABUSHIKI KAISHA, Tokyo (JP)

(72) Inventor: Akira Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/168,435

(22) Filed: Feb. 5, 2021

(65) Prior Publication Data

US 2021/0258453 A1     Aug. 19, 2021

(30) Foreign Application Priority Data

Feb. 17, 2020 (JP) .............................. JP2020-024750

(51) Int. Cl.
*H04N 5/217* (2011.01)
*G02B 7/02* (2021.01)
(Continued)

(52) U.S. Cl.
CPC ........... *H04N 5/2171* (2013.01); *G02B 7/022* (2013.01); *G02B 27/646* (2013.01); *H04N 5/22521* (2018.08); *H04N 5/23287* (2013.01)

(58) Field of Classification Search
CPC ............. H04N 5/2171; H04N 5/22521; H04N 5/23258; H04N 5/23287; H04N 5/2254; H04N 5/2328; G02B 27/646
See application file for complete search history.

(56) References Cited

U.S. PATENT DOCUMENTS 8,587,676 B2 * 11/2013 Kim ..................... H04N 5/2328
348/208.7
11,095,818 B2 * 8/2021 Tani ..................... H04N 5/2328
(Continued)

FOREIGN PATENT DOCUMENTS

JP       2014164172 A    9/2014
JP       5725882 B2      5/2015

*Primary Examiner* — Nicholas G Giles
(74) *Attorney, Agent, or Firm* — Canon U.S.A., Inc. I.P. Division

(57) ABSTRACT

An image capturing apparatus includes a vibration device, a vibration transmission member, a housing that holds the vibration transmission member, a movable portion, and an optical member. The vibration device vibrates the image capturing apparatus to give a user a feeling corresponding to a user operation performed on an operation portion. The vibration transmission member transmits a vibration. The movable portion holds an image sensor that moves within a first area in a direction different from an optical axis to perform image blur correction. The optical member is arranged on an object side of the image sensor and on the optical axis. While the image sensor is located in the first area, the optical member and the vibration transmission member are not in contact with each other. When the image sensor moves to a second area outside the first area, the optical and vibration transmission members are brought into contact.

11 Claims, 7 Drawing Sheets

(51) Int. Cl.
*G02B 27/64* (2006.01)
*H04N 5/232* (2006.01)
*H04N 5/225* (2006.01)

(56) References Cited

U.S. PATENT DOCUMENTS

| | | | |
|---|---|---|---|
| 2012/0162455 A1* | 6/2012 | Kim | H04N 5/2328 348/208.12 |
| 2012/0188639 A1* | 7/2012 | Urakami | H04N 5/2171 359/508 |
| 2014/0104453 A1* | 4/2014 | Fujinawa | H04N 5/23219 348/222.1 |
| 2015/0138387 A1* | 5/2015 | Kokubu | G03B 17/02 348/222.1 |
| 2020/0322517 A1* | 10/2020 | Tani | G03B 17/38 |

* cited by examiner

IMAGE CAPTURING APPARATUS, METHOD FOR THE SAME, AND STORAGE MEDIUM WHERE WHILE AN IMAGE SENSOR IS LOCATED IN AN AREA AN OPTICAL MEMBER AND A VIBRATION TRANSMISSION MEMBER ARE NOT IN CONTACT WITH EACH OTHER

BACKGROUND

Field

The present disclosure relates to a dust reduction unit that shakes off a foreign substance such as dust on the front surface of an optical filter, and an image capturing apparatus such as a digital camera provided with the dust reduction unit.

Description of the Related Art

In an electronic apparatus such as a digital camera that captures an image by converting an object image into an electrical signal, an imaging light beam is received by an image sensor and a photoelectric conversion signal output from the image sensor is converted into image data.

Such an image capturing apparatus includes an optical low pass filter and an infrared absorption filter that are arranged on the object side of the image sensor.

If a foreign substance such as dust adheres to the surfaces of these filters, the adhering portion appears in an image as a black spot, which deteriorates the appearance of the image.

Particularly, in the case of an interchangeable lens type digital single-lens reflex camera, a foreign substance such as dust may enter into the main body of the camera from the opening of a lens mount at the time of exchanging the lens, and adhere to a filter surface.

In order to avoid such a phenomenon, Japanese Patent No. 5725882 discusses a vibration device that vibrates an optical filter provided on the object side of an image sensor.

Accordingly, Japanese Patent No. 5725882 discusses a dust reduction (hereinafter referred to as DR) function using a mechanism that removes a foreign substance such as dust adhering to the surface of the optical filter.

Meanwhile, operation members such as a rotation ring, a dial, and a button included in a conventional electronic apparatus are often configured to give an operational feeling such as a click feeling in response to a user's operation.

Japanese Patent Application Laid-Open No. 2014-164172 discusses a configuration in which a plurality of vibration devices is arranged on a release button surface and a grip portion to vibrate in response to a user's operation, and thereby give an operational feeling to the user.

However, to incorporate the conventional techniques discussed in Japanese Patent No. 5725882 and Japanese Patent Application Laid-Open No. 2014-164172 together into a camera, the camera is to be equipped with both a vibration device for performing the DR function and a vibration device for giving an operational feeling, and thus have a large complicated configuration.

Therefore, it is desirable to integrate the vibration devices, but the vibration generated by a conventional vibration device optimum for DR is weak and not suitable for giving an operational feeling.

In addition, a vibration for giving an operational feeling to the user is not effective for DR.

SUMMARY

The present disclosure is directed to providing an image capturing apparatus that uses a single vibration device arranged in the apparatus to give an optimum vibration for each of a dust reduction (DR) and an operational feeling for tactile feedback.

According to an aspect of the present disclosure, an image capturing apparatus includes a vibration device configured to vibrate the image capturing apparatus to give a user a feeling corresponding to an operation performed by the user on an operation portion, a vibration transmission member configured to transmit a vibration of the vibration device, a housing configured to hold the vibration transmission member, a movable portion configured to hold an image sensor that moves within a first movable area in a direction different from an optical axis to perform image blur correction, and an optical member arranged on an object side of the image sensor and on the optical axis, wherein, while the image sensor is located in the first movable area, the optical member and the vibration transmission member are not in contact with each other, and wherein, when the image sensor moves to a second movable area formed outside the first movable area, the optical member and the vibration transmission member are brought into contact with each other.

Further features of the present disclosure will become apparent from the following description of exemplary embodiments with reference to the attached drawings.

DESCRIPTION OF THE EMBODIMENTS

An example of an electronic apparatus according to an exemplary embodiment of the present disclosure will be described below with reference to FIGS. 1A to 7.

(Perspective View of Main Body of Image Capturing Apparatus)

Figure 1A:
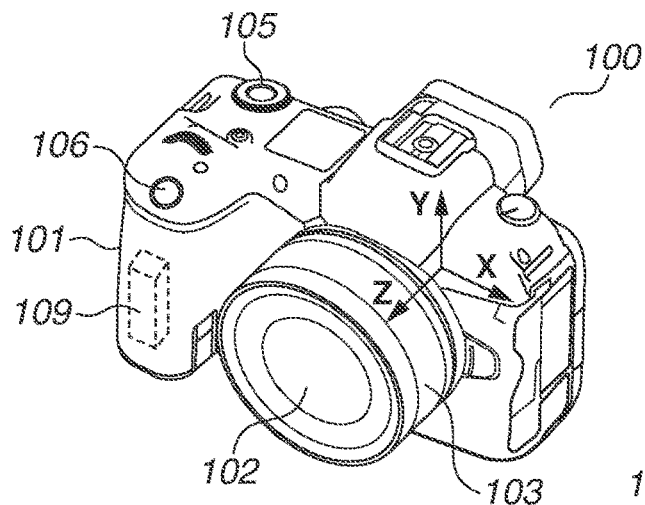
FIGS. 1A and 1B are perspective views illustrating a front side and a back side of a camera according to an exemplary embodiment, respectively.
Figure 1B:
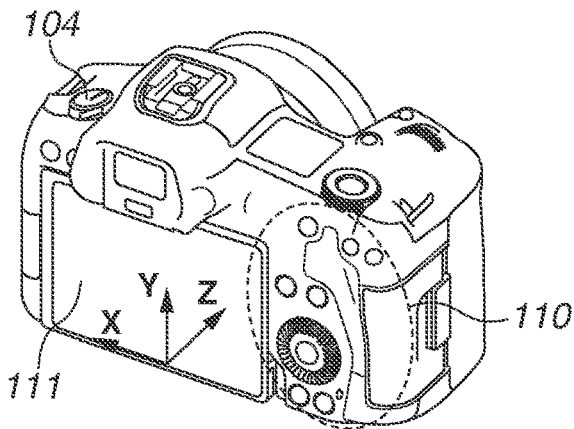
Figure 1C:
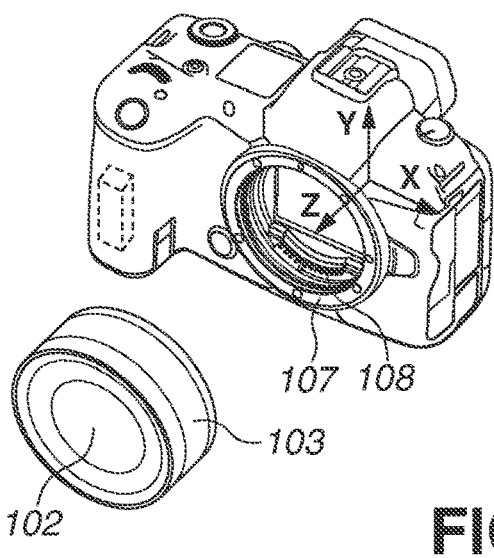
FIG. 1C is an exploded perspective view illustrating mounting of an interchangeable lens on a main body of the camera.

FIGS. 1A to 1C are perspective views each illustrating a main body of an interchangeable lens type digital camera (hereinafter referred to as a camera) 100 as an image capturing apparatus that can mount an interchangeable lens 102.

FIGS. 1A and 1B are perspective views illustrating a front side and a back side of the main body of the camera 100, respectively. FIG. 1C illustrates a state of the camera 100 before the interchangeable lens 102 is mounted thereon.

Figure 1D:
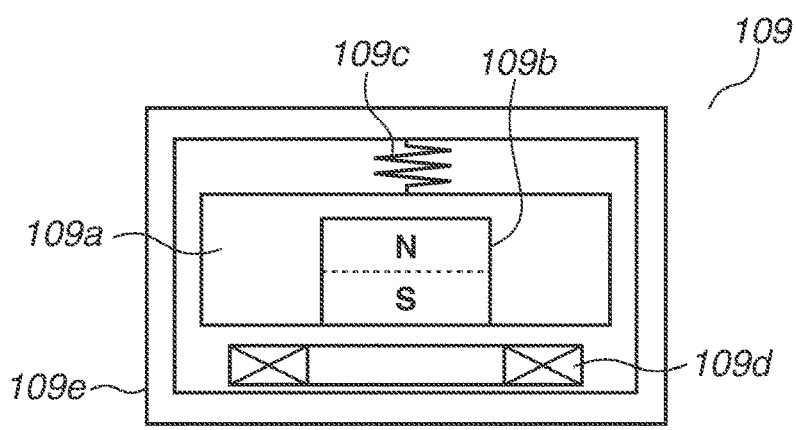
FIG. 1D is a diagram illustrating an internal structure of a vibration device.

FIG. 1D illustrates an internal structure of a vibration device 109.

A front grip 101 protruding forward is provided on the front of the camera 100 so that a user can hold the camera 100.

In addition, a mount unit 107 that enables the interchangeable lens 102 to be attached and detached is provided on the center of the front of the camera 100.

A rotation operation ring 103 is provided on the outer periphery of the interchangeable lens 102.

The user can perform rotation operation of the rotation operation ring 103 around the optical axis of the interchangeable lens 102. The user can assign the function of changing an image capturing condition such as a focal position and an exposure value to the rotation operation ring 103.

A power supply lever 104, a mode dial 105, and a release button 106 are arranged on the top side of the camera 100.

The power supply lever 104 is an operation portion for switching on/off of the camera 100 with a lever operation by the user.

An image capturing start portion according to the present exemplary embodiment can be applied to the release button (SW1 and SW2) 106 and a touch shutter for performing a touch operation with a user's finger on a display unit 111.

The touch shutter is the function of allowing the user to specify a focus point by touching a monitor screen of the camera 100 with a finger, which is referred to as "touch focus", and to release the shutter immediately after lifting the finger from the screen.

The mode dial 105 is an operation portion for switching between image capturing modes with a rotation operation by the user.

The image capturing modes include a manual still image capturing mode in which the user can arbitrarily set image capturing conditions such as a shutter speed and an aperture value, an automatic still image capturing mode in which an appropriate exposure amount can be automatically obtained, and a moving image capturing mode for capturing a moving image.

The release button 106 is an operation portion for starting image capturing with a pressing operation by the user. The vibration device 109 (described below) is attached inside the front grip 101.

The vibration device 109 is, for example, a linear resonant actuator (LRA) type or a piezoelectric element type vibration device, and vibration parameters such as a vibration intensity (amplitude) and a vibration frequency can be variably set.

The vibration device 109 generates a vibration in response to an operation performed by the user on an operation member such as the rotation operation ring 103, the mode dial 105, or the release button 106.

Furthermore, the vibration device 109 can generate vibrations of various vibration patterns by changing the vibration parameters.

A back side operation unit (operation portion) 110 and the display unit 111 are arranged on the back of the camera 100.

In a case where the camera 100 is in a power-on state and is set to the still image capturing mode or the moving image capturing mode (which is hereinafter referred to as an image capturing standby state), the display unit 111 displays an image signal (through-the-lens image) of an object image captured by an image sensor 126 (refer to FIG. 2).

In addition, the display unit 111 displays image capturing parameters indicating the image capturing conditions such as the shutter speed and the aperture value. The user can change a set value of an image capturing parameter by operating the back side operation unit 110 while viewing the display on the display unit 111.

The back side operation unit 110 includes a reproduction button for reproducing a recorded captured image, and a menu button for shifting to an advanced setting screen of the camera 100. By operating these buttons, the user brings the camera 100 into a non-image capturing state in which image capturing cannot be performed.

When the user operates the reproduction button, the captured image is reproduced and displayed on the display unit 111. When the user operates the menu button, various setting screens are displayed on the display unit 111. When the user operates other buttons on the back side operation unit 110, various settings can be switched.

The mount unit 107 of the camera 100 includes an electrical contact group 108. The camera 100 communicates with and supplies power to the interchangeable lens 102 mounted on the mount unit 107 via the electrical contact group 108.

FIG. 1D illustrates the internal structure of the vibration device 109.

The LRA type vibration device 109 includes a vibrator 109a, a magnet 109b, a spring 109c, a coil 109d, and a base 109e.

The vibrator 109a holds the magnet 109b and is movably coupled to the base 109e with the spring 109c.

The coil 109d is arranged near the magnet 109b and electrically connected to a control unit 115 (refer to FIG. 2) to be described below.

When the control unit 115 applies a current to the coil 109d, the coil 109d generates an electromagnetic force. The electromagnetic force and an attractive or repulsive force between the magnet 109b and the coil 109d cause the vibrator 109a to reciprocate, so that the vibration device 109 generates a vibration.

(Block Diagram of Interchangeable Lens and Camera)

Figure 2:
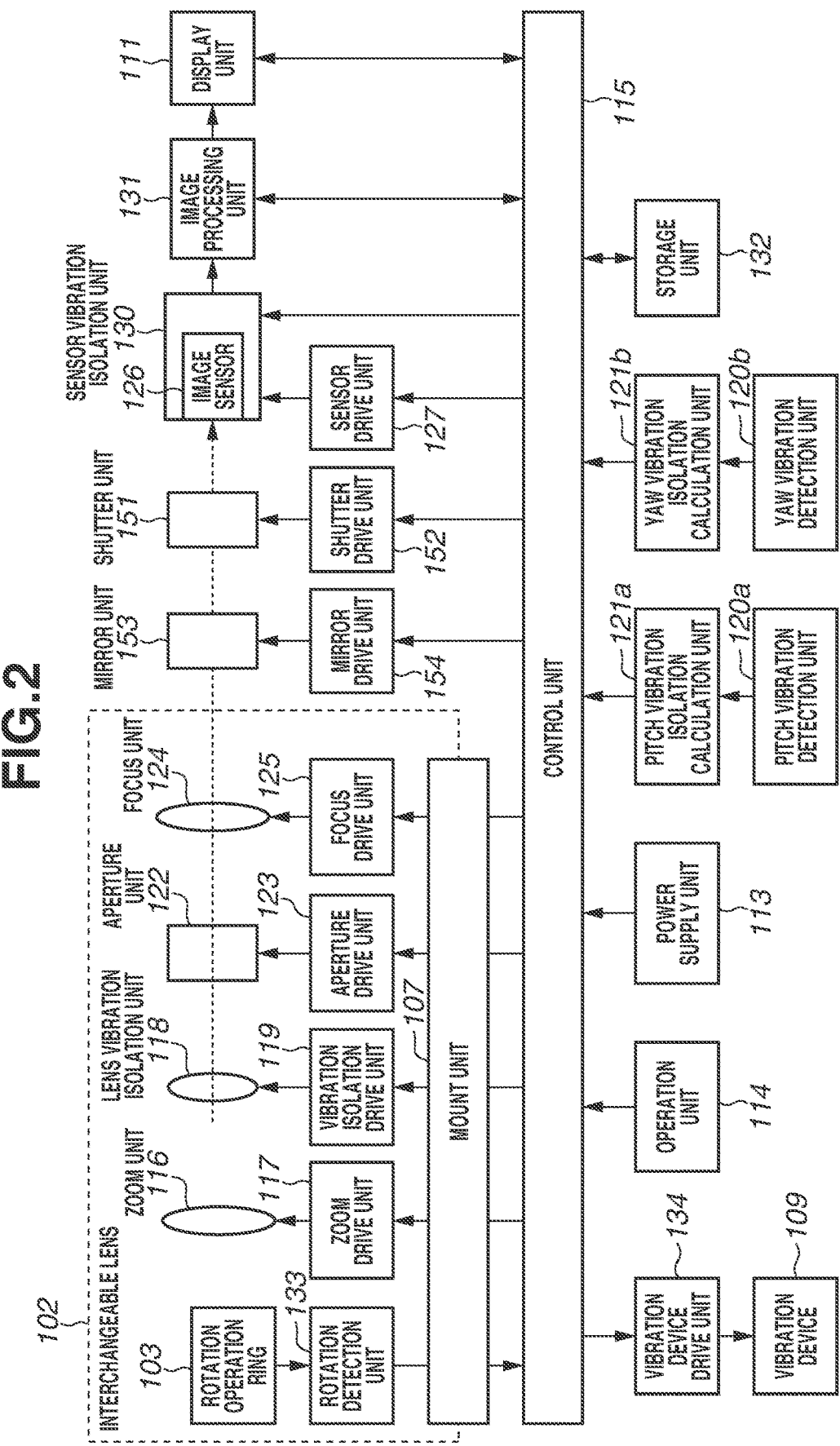
FIG. 2 is a block diagram illustrating a configuration of the camera according to the present exemplary embodiment.

FIG. 2 illustrates an electrical and optical configuration of the camera 100. The camera 100 includes a power supply unit 113 for supplying power to each unit (described below) and an operation unit 114 including the power supply lever 104, the mode dial 105, the release button 106, and the back side operation unit 110 that are described above.

The control unit 115 controls an entire camera system including the camera 100 and the interchangeable lens 102.

At this time, the interchangeable lens 102 communicates with the control unit 115 via the above-described electrical contact group 108.

The control unit 115 controls the entire camera system by reading and executing a control program stored in a memory (not illustrated).

The interchangeable lens 102 includes a zoom unit 116 including a zoom lens that can move in the optical axis direction to change magnification, and a lens vibration isolation unit 118 including a shift lens that can move in an X/Y axis direction orthogonal to the optical axis to reduce (correct) an image blur.

The interchangeable lens 102 further includes an aperture unit 122 having a light amount adjustment function, and a focus unit 124 including a focus lens that can move in the optical axis direction to adjust a focus.

The interchangeable lens 102 further includes a rotation detection unit 133 that detects rotation of the rotation operation ring 103.

When the rotation operation ring 103 is operated, and a magnification instruction is input via the rotation detection unit 133, the control unit 115 changes magnification by controlling driving of the zoom unit 116 via a zoom drive unit 117 included in the interchangeable lens 102.

In addition, the control unit 115 controls driving of the aperture unit 122 via an aperture drive unit 123 included in the interchangeable lens 102, based on the set aperture value received from the operation unit 114 or a luminance signal obtained from an image processing unit 131.

Furthermore, the control unit 115 performs autofocus by controlling driving of the focus unit 124 via a focus drive unit 125 included in the interchangeable lens 102, based on a focus signal obtained from the image processing unit 131.

The camera 100 includes a pitch vibration isolation calculation unit 121a and a yaw vibration isolation calculation unit 121b.

The pitch vibration isolation calculation unit 121a calculates shifted positions of the lens vibration isolation unit 118 (shift lens) and a sensor vibration isolation unit 130 (image sensor 126) in the Y-axis direction by using a vibration signal from a pitch vibration detection unit 120a.

The yaw vibration isolation calculation unit 121b calculates shifted positions of the lens vibration isolation unit 118 and the sensor vibration isolation unit 130 in the X-axis direction by using a vibration signal from a yaw vibration detection unit 120b.

The camera 100 includes a sensor drive unit 127 for driving the sensor vibration isolation unit 130.

The interchangeable lens 102 includes a vibration isolation drive unit 119 for driving the lens vibration isolation unit 118.

The control unit 115 controls the shifted positions of the lens vibration isolation unit 118 and the sensor vibration isolation unit 130 via the vibration isolation drive unit 119 and the sensor drive unit 127, based on the shifted positions in pitch/yaw directions calculated by the pitch vibration isolation calculation unit 121a and the yaw vibration isolation calculation unit 121b.

Accordingly, a vibration isolation operation for correcting an image blur is performed.

The camera 100 includes a mirror unit 153 including a main mirror and a sub mirror (not illustrated), and a mirror drive unit 154 for driving the mirror unit 153.

The camera 100 includes a shutter unit 151 including a mechanical focal-plane shutter (not illustrated) and a shutter drive unit 152 for driving the shutter unit 151.

The control unit 115 controls driving of the shutter unit 151 and the mirror unit 153 via the shutter drive unit 152 and the mirror drive unit 154, respectively, based on an image capturing instruction operation with the release button 106.

Accordingly, an optical image formed by the interchangeable lens 102 is exposed on the image sensor 126, photoelectrically converted by the image sensor 126, and output as an image capturing signal.

The image processing unit 131 performs various types of image processing on the image capturing signal to generate an image signal and stores the image signal in a storage unit 132 such as a secure digital (SD) card.

The display unit 111 displays the image signal (through-the-lens image) output from the image processing unit 131, reproduces and displays a captured image stored in the storage unit 132, and the like.

If an operation performed on the rotation operation ring 103 or the operation unit 114 is detected, the control unit 115 controls the vibration device 109 via a vibration device drive unit 134 to generate a vibration.

As described above, the vibration device 109 vibrates the front grip 101 illustrated in FIG. 1A.

Accordingly, it is possible to give, to the user who holds the front grip 101, a click feeling corresponding to a rotation operation performed on the rotation operation ring 103 or an operational feeling corresponding to an operation performed on the operation unit 114.

If the user operates the power supply lever 104 to power off the camera 100, or a condition (refer to FIG. 7) to be described below is satisfied, the control unit 115 shifts the sensor vibration isolation unit 130 via the sensor drive unit 127.

At this time, the sensor vibration isolation unit 130 is shifted to a position at which the vibration generated by the vibration device 109 is transmitted to the image sensor 126.

Then, the control unit 115 controls the vibration device 109 via the vibration device drive unit 134 to generate a vibration and transmits the vibration to the surface of the image sensor 126, thereby performing a dust reduction (DR) function for removing dust adhering to the image sensor 126.

(Sensor Vibration Isolation Unit 130)

Figure 3A:
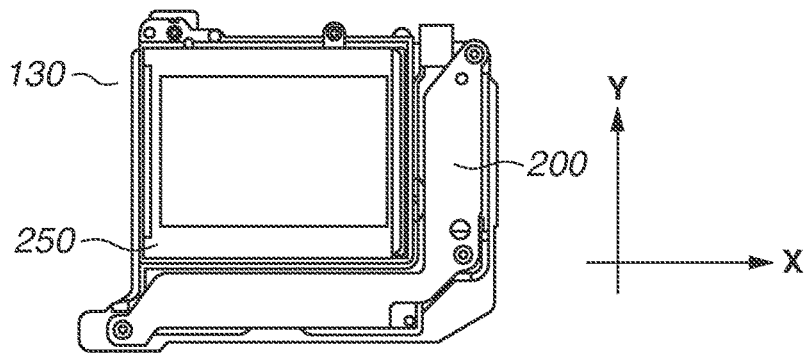
FIG. 3A is a front view illustrating a sensor vibration isolation unit according to the present exemplary embodiment.
Figure 3B:
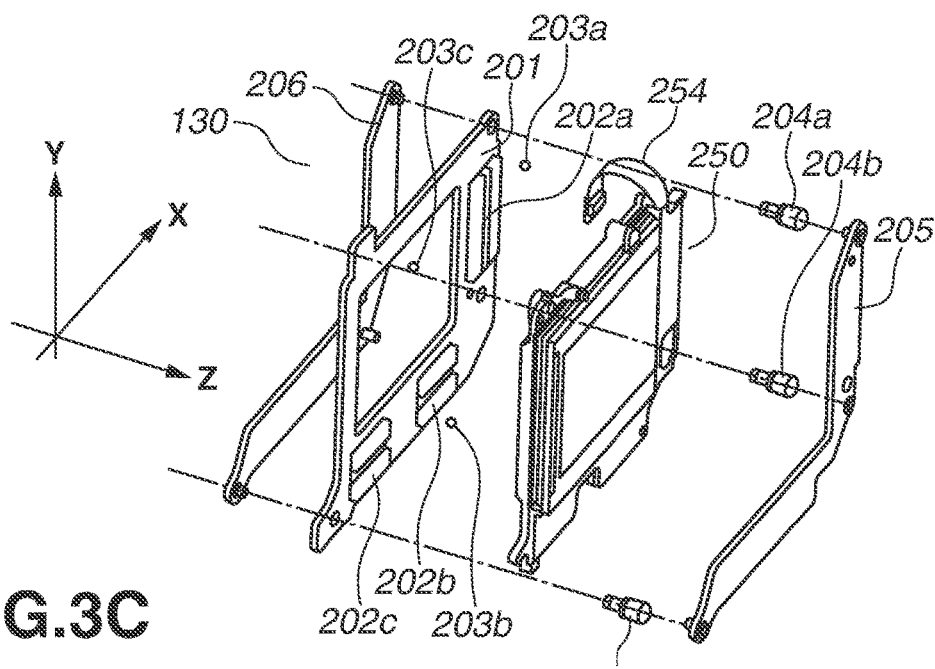
FIGS. 3B and 3C are exploded perspective views each illustrating the sensor vibration isolation unit according to the present exemplary embodiment.
Figure 3C:
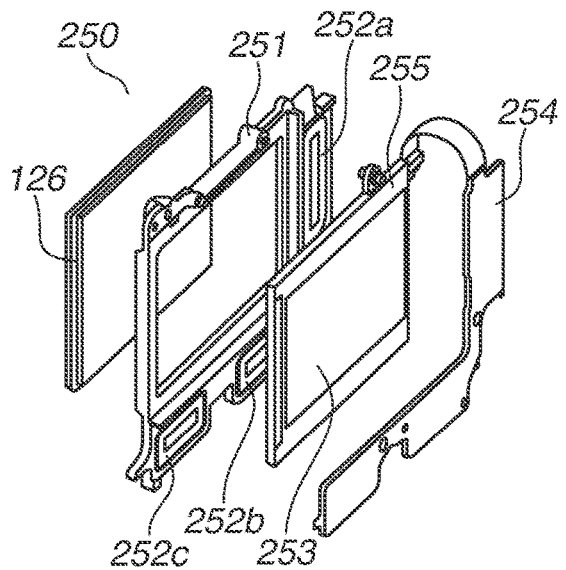

Each of FIGS. 3A to 3C illustrates a configuration example of the sensor vibration isolation unit 130.

FIG. 3A is a front view of the sensor vibration isolation unit 130. FIG. 3B is an exploded perspective view of a fixed portion 200 of the sensor vibration isolation unit 130. FIG. 3C is an exploded perspective view of a movable portion 250 of the sensor vibration isolation unit 130.

The sensor vibration isolation unit 130 includes the fixed portion 200 and the movable portion 250.

The fixed portion 200 includes a base plate 201 to which magnets 202a, 202b, and 202c are fixed.

Balls 203a, 203b, and 203c as rolling members are in contact with the base plate 201, and are sandwiched between the base plate 201 and a holding frame 251 of the movable portion 250 (described below).

The fixed portion 200 is fixed to a base unit (also referred to as a housing) 300 (refer to FIGS. 4A and 4B) to be described below.

The base plate 201 has mounting holes for mounting spacers 204a, 204b, and 204c. A front yoke 205 and a rear yoke 206 are respectively fixed to one end and the other end of the spacers 204a, 204b, and 204c.

In a space formed between the base plate 201 and the front yoke 205, the movable portion 250 is held to be able to move in an XY plane in FIG. 3B.

Each of the magnets 202a, 202b, and 202c is magnetized to generate a magnetic flux density in the optical axis direction (Z direction), and is arranged between the front yoke 205 and the rear yoke 206 at a position facing each of the front yoke 205 and the rear yoke 206.

Thus, the front yoke 205, the magnets 202a, 202b, and 202c, and the rear yoke 206 form a magnetic circuit (closed magnetic circuit).

The front yoke 205 and the rear yoke 206 are attracted by a magnetic force of the magnets 202a, 202b, and 202c.

The movable portion 250 includes the holding frame 251 that includes the image sensor 126, coils 252a, 252b, and 252c, an optical filter 253, and a coil board 254.

The coils 252a, 252b, and 252c are fixed at positions facing the magnets 202a, 202b, and 202c, respectively, and are soldered to the coil board 254 to secure electric conduction.

The coil board 254 includes a position detection element (not illustrated). A Hall element for detecting a position using the above-described magnetic circuit is used as the position detection element.

The Hall element is small and thus can be arranged to be located inside windings of the coils 252a, 252b, and 252c.

The coil board 254 is connected to a main board (not illustrated).

The coils 252a, 252b, and 252c, the coil board 254, and the position detection element (not illustrated) are a drive mechanism of the above-described sensor drive unit 127, and the main board (not illustrated) includes the above-described control unit 115.

Thus, if currents are applied to the coils 252a, 252b, and 252c based on a control signal from the above-described control unit 115, a force according to the Fleming's left-hand rule is generated, and the movable portion 250 is driven in XY directions to perform a vibration isolation operation for correcting an image blur.

The image sensor 126 is connected to the main board (not illustrated) by a flexible printed circuit board (FPC) (not illustrated).

The optical filter 253 is held by a filter holding frame 255 and has a substantially rectangular shape for covering an area larger than an effective pixel area of the image sensor 126. The filter holding frame 255 is fixed to the holding frame 251.

Hereinafter, drawings will be described based on the XYZ directions indicated in FIGS. 3A to 3C.

(Base Unit 300)

Figure 4A:
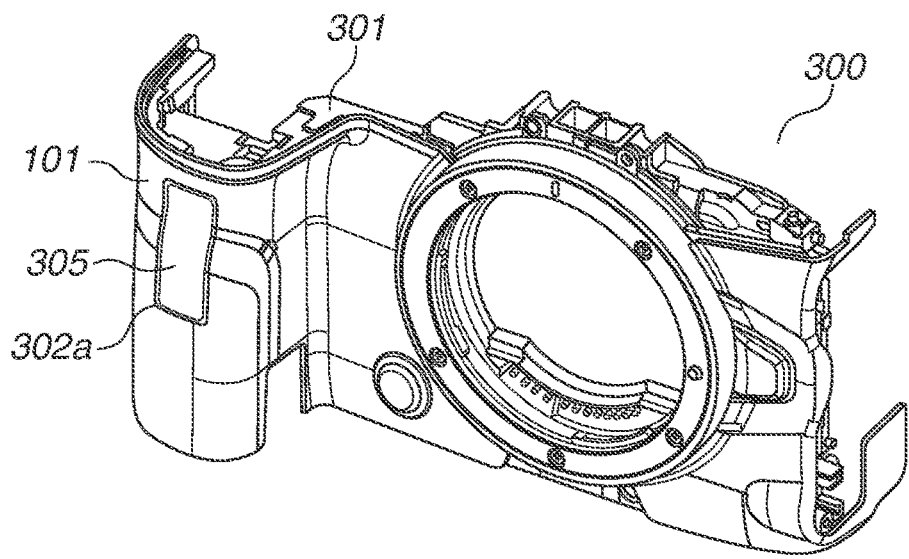
FIGS. 4A and 4B are exploded perspective views each illustrating a base unit according to the present exemplary embodiment.
Figure 4B:
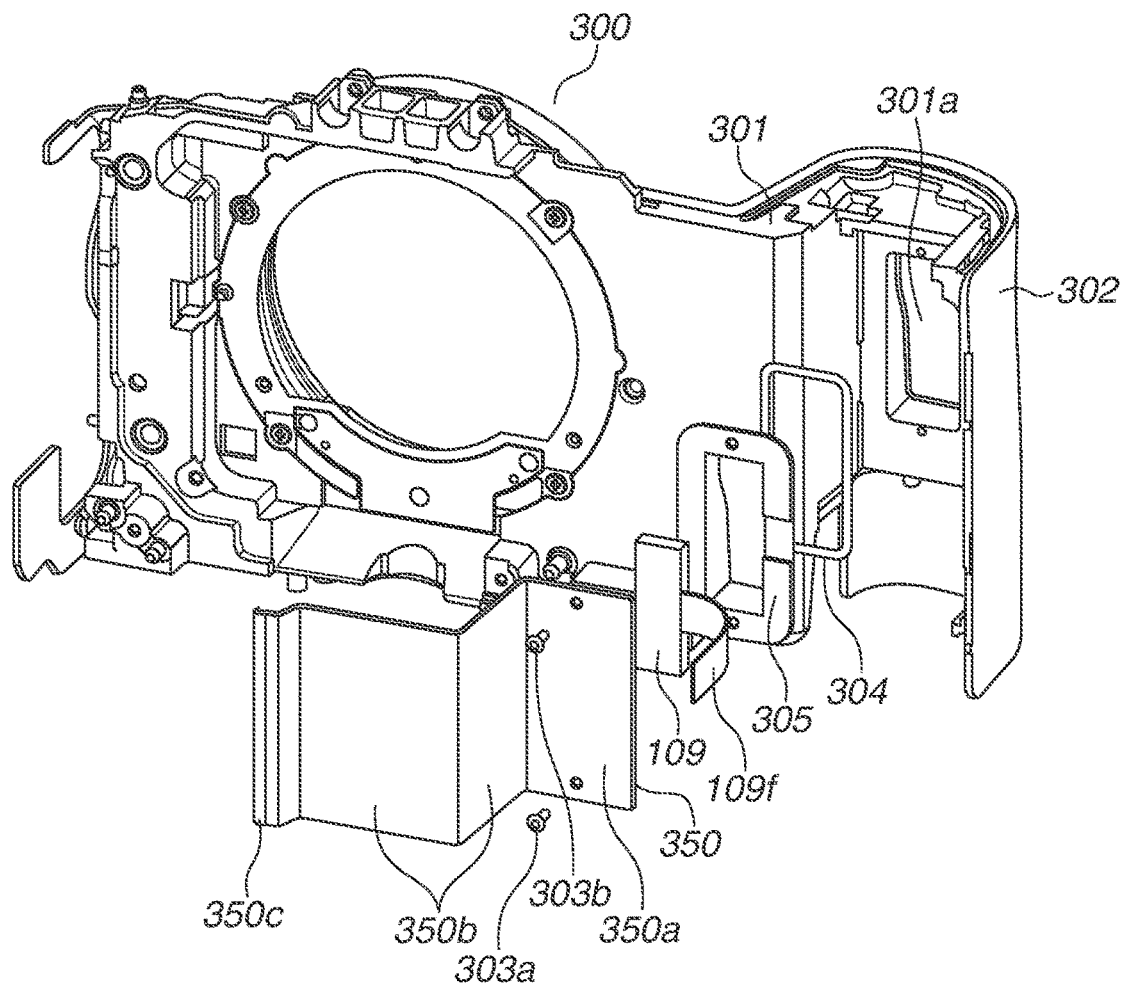

FIG. 4A is a front perspective view of the base unit 300. FIG. 4B is an exploded perspective view of the base unit 300.

The base unit 300 includes a base member 301 for fixing an exterior cover (not illustrated), has elasticity on a surface layer from a front surface portion to a side surface portion, and also includes the front grip 101 for the user to hold.

The front grip 101 is fixed to the base member 301 with a double-sided adhesive tape (not illustrated).

In addition, the front grip 101 includes an opening portion 302a through which the surface of a grip portion 305 (described below) is exposed.

The grip portion 305 is arranged to be flush with the front grip 101 or to protrude from the front grip 101, so that when the user holds the front grip 101, the user also holds the grip portion 305.

The base member 301 holds the vibration device 109, the grip portion 305, and a vibration transmission member 350.

The vibration device 109 includes a vibration device board portion 109f on which a circuit for driving the vibration device 109 is wired. The vibration device board portion 109f electrically connects the main board (not illustrated) and the vibration device 109 with each other.

In addition, the vibration device 109 is fixed to a vibration device fixing portion 350a of the vibration transmission member 350 with a double-sided adhesive tape (not illustrated).

The vibration transmission member 350 is formed of a material that is elastically deformable and can easily transmit a vibration.

In addition, the vibration transmission member 350 is fixed to the base member 301 with screws 303a and 303b, which also causes the grip portion 305 to be fixed to the base member 301.

The base member 301 includes an opening portion 301a through which the grip portion 305 is exposed to the exterior.

A vibration attenuation member 304 is sandwiched between the grip portion 305 and the base member 301. The vibration attenuation member 304 is formed of a material such as rubber or an elastomer that can be largely deformed by a small force and has a large elastic deformation range.

Thus, if the vibration device 109 is driven to generate, for example, an operational feeling vibration $V_1$, the grip portion 305 vibrates, whereas the vibration is hardly transmitted to the base member 301 by the vibration attenuation member 304.

The vibration transmission member 350 includes an arm portion 350b that extends from the vibration device fixing portion 350a. The arm portion 350b includes a contact portion 350c on a leading end thereof.

When the contact portion 350c comes into contact with the filter holding frame 255 of the movable portion 250, which has been described above with reference to FIGS. 3A to 3C, the vibration of the vibration device 109 is transmitted to the filter holding frame 255 and the optical filter 253.

In other words, the contact portion 350c transmits the vibration for the DR function that removes dust on the optical filter 253.

(Operations of Vibration Transmission Member 350 and Sensor Vibration Isolation Unit 130)

FIGS. 5A, 5B, 6A, and 6B illustrate operations of the vibration transmission member 350 and the sensor vibration isolation unit 130.

Figure 5A:
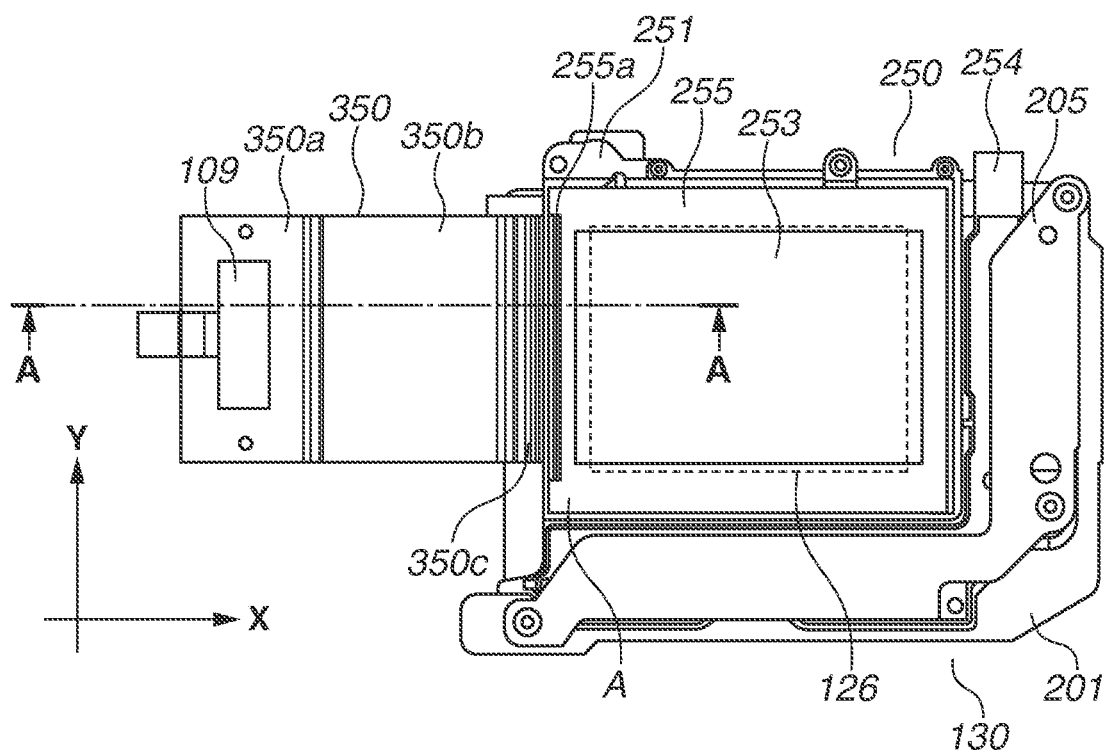
FIGS. 5A and 5B are a front view and a cross-sectional view illustrating a vibration transmission member and the sensor vibration isolation unit according to the present exemplary embodiment, respectively.
Figure 5B:
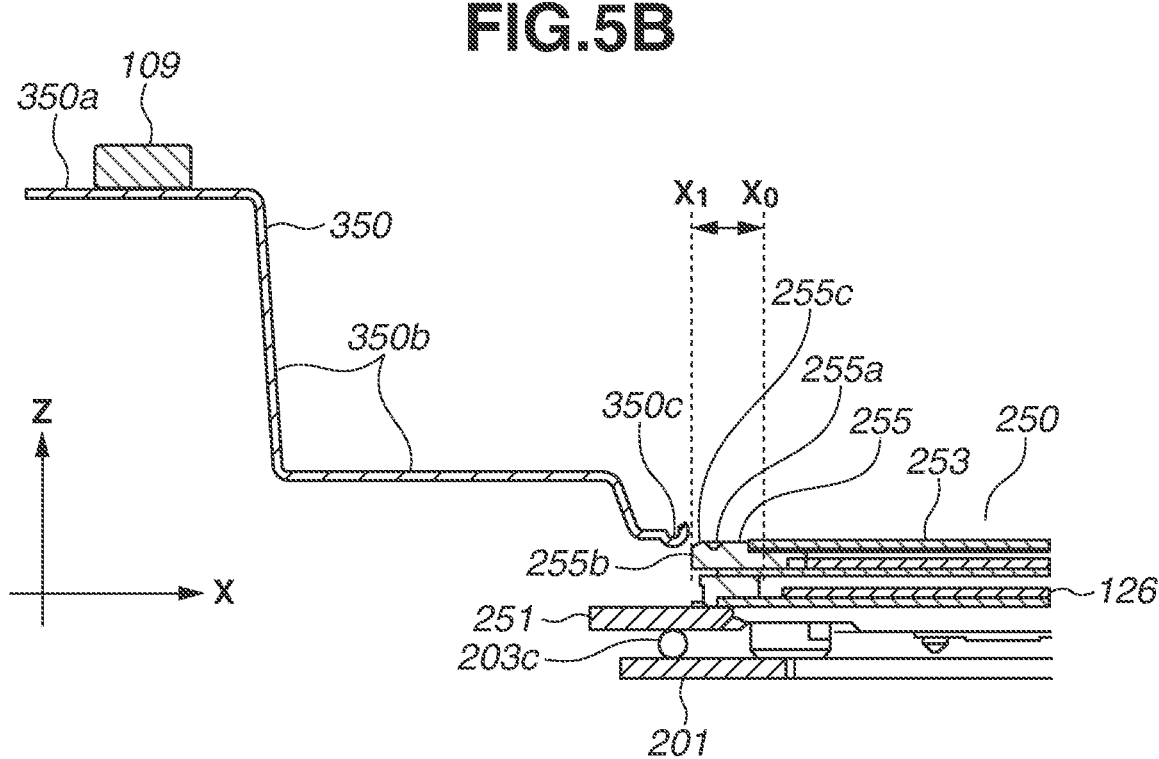

FIG. 5A is a front view of the sensor vibration isolation unit 130 and the vibration transmission member 350 in a sensor vibration isolation operation. FIG. 5B is a cross-sectional view taken along a line A-A in FIG. 5A.

Each of FIGS. 5A and 5B illustrates the movable portion 250 that has moved furthest in a −X direction in the sensor vibration isolation operation.

A side surface portion 255b is one side of the filter holding frame 255 that is closer to the vibration transmission member 350. A position of the side surface portion 255b in the state illustrated in FIGS. 5A and 5B is referred to as a position $X_1$.

In addition, the position of the side surface portion 255b in a state where the movable portion 250 has moved furthest in a +X direction is referred to as a position $X_0$.

Thus, in a case where the movable portion 250 moves in the X direction in the sensor vibration isolation operation, the side surface portion 255b of the filter holding frame 255 can move between the position $X_0$ and the position $X_1$.

Hereinafter, an area between the position $X_0$ and the position $X_1$ is referred to as a first movable area.

The contact portion 350c of the vibration transmission member 350 is arranged on a position further than the position $X_1$ in the −X direction.

More specifically, even if the movable portion 250 moves to the position $X_1$, the vibration transmission member 350 does not come into contact with the holding frame 251, so that even if the vibration device 109 generates a vibration, the vibration is not transmitted to the movable portion 250.

The sensor vibration isolation unit 130 is fixed to the above-described base unit 300, and the vibration of the vibration device 109 is hardly transmitted to the base member 301 as described above.

Therefore, the vibration of the vibration device 109 is hardly transmitted to the sensor vibration isolation unit 130 in the sensor vibration isolation operation.

Next, a case will be described in which the movable portion 250 of the sensor vibration isolation unit 130, which is in the state illustrated in FIGS. 5A and 5B, further moves in the −X direction in order to perform a DR operation, so that the side surface portion 255b of the filter holding frame 255 moves beyond the position $X_1$ to a position $X_2$ (described below).

In the state illustrated in FIGS. 5A and 5B, the contact portion 350c of the vibration transmission member 350 is located closer to the image sensor 126 than a surface A on the object side of the filter holding frame 255.

Thus, if the movable portion 250 moves beyond the position $X_1$ in the −X direction, the side surface portion 255b of the filter holding frame 255 is brought into contact with the contact portion 350c.

Furthermore, a corner between the side surface portion 255b and the surface A forms a chamfered slope portion 255c. Thus, in a case where the movable portion 250 moves in the −X direction, the contact portion 350c runs on the surface A via the slope portion 255c and slides on the surface A until the side surface portion 255b reaches the position $X_2$.

Figure 6A:
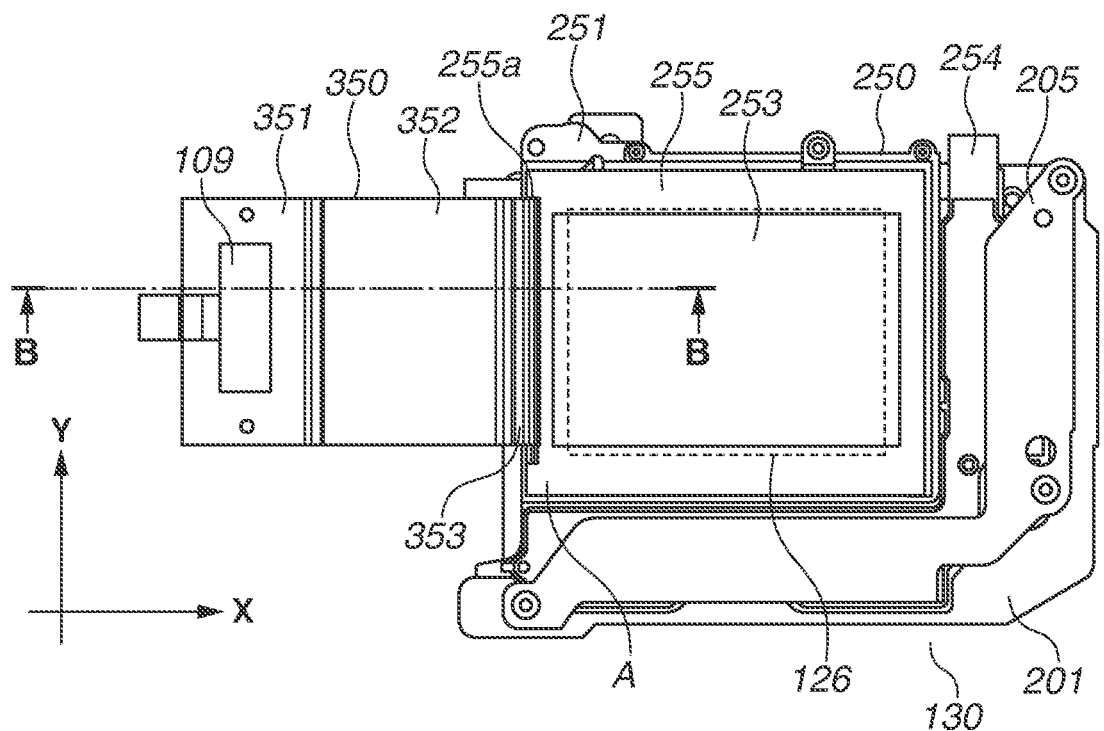
FIGS. 6A and 6B are another front view and another cross-sectional view illustrating the vibration transmission member and the sensor vibration isolation unit according to the present exemplary embodiment, respectively.
Figure 6B:
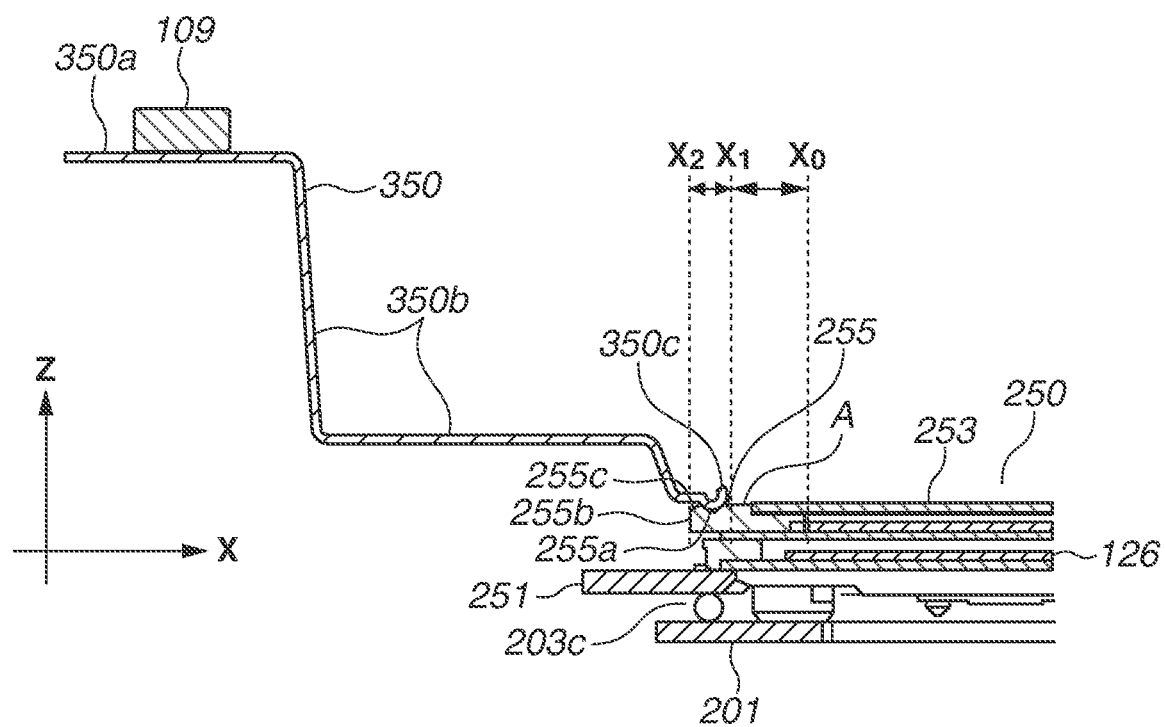

If the side surface portion 255b reaches the position $X_2$, the vibration transmission member 350 and the sensor vibration isolation unit 130 are brought into a state illustrated in FIGS. 6A and 6B.

The vibration transmission member 350 is elastically deformable, and thus the arm portion 350b is elastically deformed in a state where the contact portion 350c runs on the surface A, so that the contact portion 350c presses the filter holding frame 255 in a −Z direction.

FIG. 6A is a front view of the sensor vibration isolation unit 130 and the vibration transmission member 350 in the DR operation. FIG. 6B is a cross-sectional view taken along a line B-B in FIG. 6A.

In the DR operation, the movable portion 250 moves to a position coming into contact with the vibration transmission member 350. The position of the side surface portion 255b of the filter holding frame 255 at this time is referred to as the position $X_2$.

The position $X_2$ is located further than the above-described first movable area in the −X direction. The filter holding frame 255 does not enter an area between the position $X_1$ and the position $X_2$ during the sensor vibration isolation operation. Hereinafter, the area between the position $X_1$ and the position $X_2$ is referred to as a second movable area.

A holding groove 255a is provided on the surface A of the filter holding frame 255. In the present exemplary embodiment, the holding groove 255a has a concave shape and the contact portion 350c has a round (R) shape. The contact portion 350c engages with the holding groove 255a at the position $X_2$, and presses the filter holding frame 255 in the −Z direction.

The contact portion 350c and the holding groove 255a may have any shape as long as the contact portion 350c and the holding groove 255a can engage with each other. For example, the holding groove 255a may have a convex shape, and the contact portion 350c may climb over the convex shape and engage with the holding groove 255a.

However, it is desirable that the contact portion 350c presses the filter holding frame 255. Particularly, by matching the pressing direction with a vibration direction of the vibration device 109, the vibration generated by the vibration device 109 can be transmitted to the optical filter 253 more efficiently.

In a state where the contact portion 350c engages with the holding groove 255a, the engagement between the contact portion 350c and the holding groove 255a is hardly disengaged because of the own weight of the movable portion 250.

At the position $X_2$, at least one of the balls 203a, 203b, or 203c as the above-described rolling members is located on the projected line of the contact portion 350c in the Z direction.

Accordingly, the movable portion 250, which is pressed in the −Z direction by the vibration transmission member 350, is prevented from escaping toward the −Z direction, and the contact portion 350c and the filter holding frame 255 are assuredly brought into contact with each other. As a result, efficient vibration transmission can be achieved.

Alternatively, the contact portion 350c may be placed at a position sandwiched between at least two of the balls 203a, 203b, or 203c as the rolling members. Even in this case, the vibration can be efficiently transmitted since the movable portion 250 is pressed in the −Z direction without being pushed.

In the present exemplary embodiment, the holding groove 255a is provided on the filter holding frame 255 and between the vibration device 109 and the optical filter 253, and has a length equal to or longer than a length of one side of the optical filter 253.

More specifically, the vibration generated by the vibration device 109 is transmitted in the X direction to the optical filter 253 uniformly from one side closer to the holding groove 255a to one side on the opposite side.

As a result, a foreign substance such as dust on the optical filter 253 can be efficiently removed. The holding groove 255a may be provided on the optical filter 253 as long as the holding groove 255a is not located on the projected plane of the image sensor 126 in the Z direction.

The above-described configuration of the vibration device 109, the vibration transmission member 350, and the movable portion 250 can generate both an operational feeling vibration corresponding to an operation performed by the user on the operation unit 114 and a vibration for DR by using the single vibration device 109 arranged in the camera 100.

Accordingly, the conventional vibration device for DR arranged in the movable portion 250 of the sensor vibration isolation unit 130 can be minimized or eliminated, and the size and weight of the movable portion 250 of the sensor vibration isolation unit 130 can be reduced.

The camera 100 as the image capturing apparatus according to the present exemplary embodiment includes the vibration device 109 for vibrating the image capturing apparatus and the vibration transmission member 350 for transmitting the vibration of the vibration device 109 in order to give the user a feeling corresponding to an operation performed by the user on the release button 106 as an operation portion.

The camera 100 as the image capturing apparatus according to the present exemplary embodiment further includes the housing 300 for holding the vibration transmission member 350, the movable portion 250 for holding the image sensor 126 that moves within the first movable area in a direction different from the optical axis to perform image blur correction, and the filter holding frame (hereinafter also referred to as the optical member) 255 arranged on the object side of the image sensor 126 and on the optical axis.

While the image sensor 126 is located in the first movable area (area between the position $X_0$ and the position $X_1$), the optical member 255 and the vibration transmission member 350 are not in contact with each other.

When the image sensor 126 moves to the second movable area (area between the position $X_1$ and the position $X_2$) that is formed outside the first movable area, the optical member 255 and the vibration transmission member 350 are brought into contact with each other.

The vibration transmission member 350 presses the optical member 255 in a direction parallel to the optical axis, and the direction in which the optical member 255 is pressed matches the vibration direction of the vibration device 109.

The contact portion 350c of the vibration transmission member 350 comes into contact with the holding groove 255a of the optical member 255 within the second movable area, so that the movable portion 250 is fixed within the second movable area (area between the position $X_1$ and the position $X_2$).

The optical member 255 has a rectangular shape, and a contact length between the holding groove 255a and the contact portion 350c is equal to a length of one side of the optical member 255.

The release button 106 is an operation portion for starting image capturing (i.e., an image capturing start portion). In a case where the image capturing start portion is operated while the camera 100 is not on standby for image capturing, the image sensor 126 moves from the second movable area to the first movable area (area between the position $X_0$ and the position $X_1$).

Accordingly, the optical member 255 and the vibration transmission member 350 are shifted from a state of being in contact with each other to a state of not being in contact with each other.

At least one of the balls 203a, 203b, or 203c as the rolling members that move the movable portion 250 in the direction orthogonal to the optical axis in order to perform the image blur correction is arranged at a position overlapping, in the optical axis direction (Z direction), with the position at which the vibration transmission member 350 is in contact with the optical member 255 in a state where the optical member 255 and the vibration transmission member 350 are in contact with each other.

(Flowchart for Controlling Sensor Vibration Isolation Unit 130 and Vibration Device 109)

Figure 7:
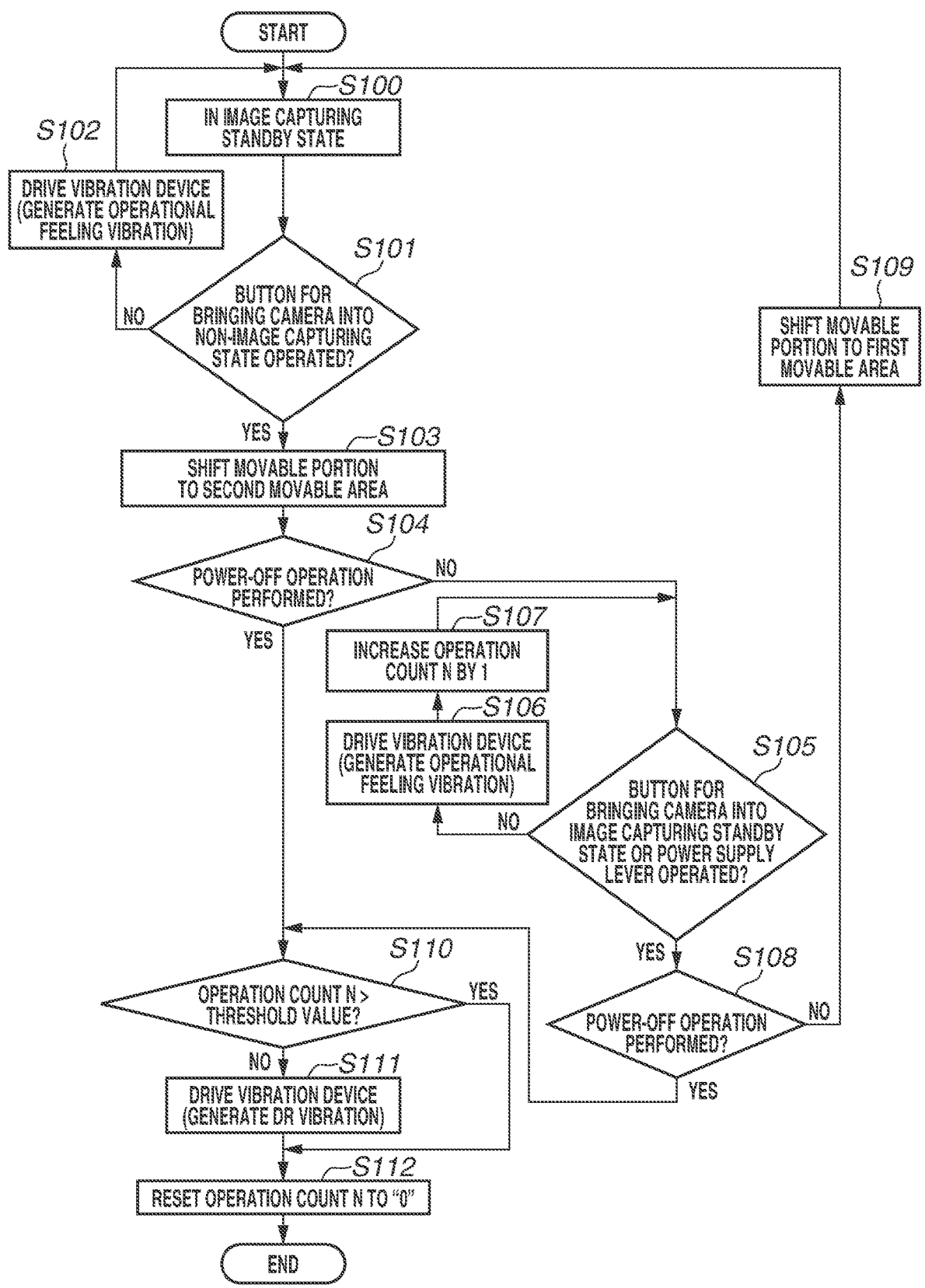
FIG. 7 is a flowchart illustrating control of the sensor vibration isolation unit and the vibration device according to the present exemplary embodiment.

FIG. 7 is a flowchart illustrating an example of control of the sensor vibration isolation unit 130 and the vibration device 109 according to the present exemplary embodiment.

In step S100, the camera 100 is in the power-on state and in the image capturing standby state where the still image capturing mode or the moving image capturing mode is set. If the user operates a button, the processing proceeds to step S101.

In the image capturing standby state, the movable portion 250 of the sensor vibration isolation unit 130 is in a state of not being in contact with the vibration transmission member 350 as illustrated in FIGS. 5A and 5B, and shifts in the X direction within the above-described first movable area to perform vibration isolation.

In step S101, it is determined whether a button for bringing the camera 100 into the non-image capturing state is operated.

In the present exemplary embodiment, the operation member that brings the camera 100 into the non-image capturing state is the menu button, the reproduction button (not illustrated), or the power supply lever 104.

If it is determined that the button for bringing the camera 100 into the non-image capturing state is not operated (NO in step S101), the processing proceeds to step S102. If it is determined that the button for bringing the camera 100 into the non-image capturing state is operated (YES in step S101), the processing proceeds to step S103.

In step S102, the vibration device 109 generates the operational feeling vibration $V_1$ in response to the button operated in step S101, and then the processing returns to step S100.

The operational feeling vibration $V_1$ can give the user an operational feeling corresponding to the button operated by the user.

In step S103, the movable portion 250 of the sensor vibration isolation unit 130 is shifted to the second movable area and to a state of being in contact with the vibration transmission member 350 as illustrated in FIGS. 6A and 6B, and the processing proceeds to step S104.

More specifically, if the camera 100 is brought into the non-image capturing state, the vibration of the vibration device 109 can be transmitted to the optical filter 253.

In step S104, it is determined whether the operation member operated in step S101 is the power supply lever 104 and a power-off operation is performed.

If it is determined that the power-off operation is performed (YES in step S104), the processing proceeds to step S110. If it is determined that the power-off operation is not performed (NO in step S104), the processing proceeds to step S105.

More specifically, if the user switches the power supply lever 104 from on to off while the camera 100 is in the image capturing standby state, the movable portion 250 moves from the first movable area to the second movable area, so that the movable portion 250 and the vibration transmission member 350 are brought into contact with each other.

In step S105, it is determined whether an operation for bringing the camera 100 into the image capturing standby state is performed, or the power-off operation is performed with the power supply lever 104.

In the present exemplary embodiment, the button for changing the camera 100 from the non-image capturing state to the image capturing standby state is the release button 106 or the menu button.

If it is determined that the operation for bringing the camera 100 into the image capturing standby state or the power-off operation is not performed (NO in step S105), the processing proceeds to step S106. If it is determined that the operation for bringing the camera 100 into the image capturing standby state or the power-off operation is performed (YES in step S105), the processing proceeds to step S108.

In step S106, the vibration device 109 generates the operational feeling vibration $V_1$ corresponding to the button operated in step S101, and then the processing proceeds to step S107.

More specifically, if the user operates a button while the camera 100 is in the non-image capturing state, the vibration device 109 generates the operational feeling vibration $V_1$ to give the user the operational feeling corresponding to the button operated by the user. At the same time, the vibration is transmitted to the optical filter 253 on the movable portion 250.

Thus, the camera 100 performs simple DR when a button is operated by the user in the non-image capturing state.

After the vibration device 109 is driven in step S106, an operation count N is increased by 1 in step S107, and then the processing returns to step S105.

The operation count N is the number or time of vibrations, and a total number or time of vibrations generated by the user's button operations are recorded if the camera 100 in the power-on state is brought into the non-image capturing state. The operation count N may be either one or both of the number and time of vibrations.

In step S108, it is determined whether the button operated in step S105 is the power supply lever 104 and the power-off operation is performed.

If it is determined that the power-off operation is performed (YES in step S108), the processing proceeds to step S110. If it is determined that the power-off operation is not performed (NO in step S108), the processing proceeds to step S109.

In step S109, the movable portion 250 of the sensor vibration isolation unit 130 is shifted from the second movable area to the first movable area, as in the state illustrated in FIGS. 5A and 5B, and the processing returns to step S100.

More specifically, if the release button 106 or the menu button is operated while the camera 100 is in the non-image capturing state, the movable portion 250 moves from the second movable area in which the movable portion 250 is in contact with the vibration transmission member 350 to the first movable area in which the movable portion 250 is not in contact with the vibration transmission member 350, and the camera 100 returns to the image capturing standby state.

In step S110, it is determined whether the operation count N counted in step S107 is more than a threshold value.

If it is determined that the operation count N is more than the threshold value (YES in step S110), the processing proceeds to step S112. If it is determined that the operation count N is the threshold value or less (NO in step S110), the processing proceeds to step S111.

More specifically, if the power supply lever 104 is operated in step S104 or S108 and the power-off operation of the camera 100 is started, the control of the vibration device 109 is changed based on the operation count N.

In step S111, the vibration device 109 generates a DR vibration $V_2$, and the processing proceeds to step S112.

In step S112, the operation count N is reset to 0, and the camera 100 is powered off.

In other words, the user switches the power supply lever 104 from on to off.

If the number of times or the time of simple DR using the operational feeling vibration $V_1$ is more than a predetermined value during a period in which the camera 100 is shifted from the power-on state to the power-off state, the dust reduction (DR) using the DR vibration $V_2$ is not performed during the power-off operation.

On the other hand, if the number of times or the time of simple DR using the operational feeling vibration $V_1$ is the predetermined value or less, the DR using the DR vibration $V_2$ is performed during the period in which the camera 100 is shifted from the power-on state to the power-off state.

The frequency and amplitude of the operational feeling vibration $V_1$ is changed depending on the operation portion, thereby giving an optimum feeling to the user.

Since the operational feeling vibration $V_1$ is a vibration to be fed back to the user as a feeling, an amplitude $A_1$ of the operational feeling vibration $V_1$ is larger than an amplitude $A_2$ of the DR vibration $V_2$, and a frequency $f_1$ of the operational feeling vibration $V_1$ is set to a low frequency so that the user easily recognizes the operational feeling vibration $V_1$ as a vibration.

In addition, a frequency $f_2$ of the DR vibration $V_2$ is set to a high frequency so that the user hardly recognizes the DR vibration $V_2$ as a vibration. Thus, an inequality amplitude $A_1$>amplitude $A_2$ holds true, and an inequality frequency $f_1$<frequency $f_2$ holds true.

Furthermore, the frequency of the DR vibration $V_2$ is near the resonance frequency of a specific mode of the filter holding frame 255 and the optical filter 253. There is a plurality of the resonance frequencies, and dust can be efficiently removed by switching between the resonance frequencies.

A vibration as an operational feeling is fed back to give a single feeling for each operation, whereas the DR operation requires a certain vibration time to remove dust.

Thus, a vibration time $T_1$ of the operational feeling vibration $V_1$ is shorter than a vibration time $T_2$ of the DR vibration $V_2$, and an inequality vibration time $T_1$<vibration time $T_2$ holds true.

Therefore, the operational feeling vibration $V_1$ is not optimum for DR, but is stronger than the DR vibration generated by the conventional piezoelectric element provided on the object side of the image sensor 126, and thus can remove dust on the optical filter 253.

The vibration device 109 according to the present exemplary embodiment has a first vibration mode ($V_1$) for giving the user a feeling corresponding to an operation performed on the release button 106 by the user, and a second vibration mode ($V_2$) for removing a foreign substance on the optical member.

In the present exemplary embodiment, in a case where the number or the time of vibrations in the first vibration mode is more than the threshold value during a period in which the camera 100 is powered on and the optical member 255 and the vibration transmission member 350 are in contact with each other, the second vibration mode is not performed in a transition period from the power-on state to the power-off state.

The optical member 255 and the vibration transmission member 350 are not in contact with each other while the camera 100 is on standby for image capturing. The optical member 255 and the vibration transmission member 350 are in contact with each other while the camera 100 is not on standby for image capturing.

When the power-on state has been shifted to the power-off state, the image sensor 126 moves to the second movable area (area between the position $X_1$ and the position $X_2$) formed outside the first movable area (area between the position $X_0$ and the position $X_1$), so that the optical member 255 and the vibration transmission member 350 are brought into contact with each other.

As described above, the position of the movable portion 250 is changed depending on whether the camera 100 is in the image capturing standby state or the non-image capturing state.

In addition, energy saving of the camera 100 can be ensured by using a vibration generated by the vibration device 109, which corresponds to a button operated by the user, for simple DR and skipping the DR operation using a DR vibration during power-off.

While the exemplary embodiment of the present disclosure has been described above, it is to be understood that the present disclosure is not limited to the above-described exemplary embodiment. Various modifications and alterations may be made without departing from the scope of the disclosure.

INDUSTRIAL APPLICABILITY

The exemplary embodiment of the present disclosure is applicable to image capturing apparatuses such as a single-lens reflex camera and a mirrorless camera.

The exemplary embodiment of the present disclosure can provide an image capturing apparatus that uses a single vibration device to give an optimum vibration for each of the dust reduction (DR) and the operational feeling corresponding to an operation performed by the user on an operation portion.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-024750, filed Feb. 17, 2020, which is hereby incorporated by reference herein in its entirety.

What is claimed is:

1. An image capturing apparatus comprising:
   a vibration device configured to vibrate the image capturing apparatus to give a user a feeling corresponding to an operation performed by the user on an operation portion;
   a vibration transmission member configured to transmit a vibration of the vibration device;
   a housing configured to hold the vibration transmission member;
   a movable portion configured to hold an image sensor that moves within a first movable area in a direction different from an optical axis to perform image blur correction; and
   an optical member arranged on an object side of the image sensor and on the optical axis,
   wherein, while the image sensor is located in the first movable area, the optical member and the vibration transmission member are not in contact with each other, and
   wherein, when the image sensor moves to a second movable area formed outside the first movable area, the optical member and the vibration transmission member are brought into contact with each other.

2. The image capturing apparatus according to claim 1, wherein the vibration transmission member presses the optical member in a direction parallel to the optical axis, and the direction in which the optical member is pressed matches a vibration direction of the vibration device.

3. The image capturing apparatus according to claim 1, wherein, when a contact portion of the vibration transmission member comes into contact with a holding groove of the optical member within the second movable area, the movable portion is fixed within the second movable area.

4. The image capturing apparatus according to claim 3, wherein the optical member has a rectangular shape, and
   wherein a contact length between the holding groove and the contact portion is equal to a length of one side of the optical member.

5. The image capturing apparatus according to claim 1, wherein the vibration device has a first vibration mode for giving the user the feeling corresponding to the operation performed by the user on the operation portion, and a second vibration mode for removing a foreign substance on the optical member, and
   wherein, when a number or a time of vibrations in the first vibration mode is more than a threshold value during a period in which the image capturing apparatus is in a power-on state and the optical member and the vibration transmission member are in contact with each other, the second vibration mode is not performed during a period in which the power-on state is shifted to a power-off state.

6. The image capturing apparatus according to claim 5, wherein, when the power-on state has been shifted to the power-off state, the image sensor moves to the second movable area formed outside the first movable area, and the optical member and the vibration transmission member are brought into contact with each other.

7. The image capturing apparatus according to claim 1, wherein the optical member and the vibration transmission member are not in contact with each other while the image capturing apparatus is on standby for image capturing, and
   wherein the optical member and the vibration transmission member are in contact with each other while the image capturing apparatus is not on standby for image capturing.

8. The image capturing apparatus according to claim 1, wherein the operation portion is an image capturing start portion, and
   wherein, when the image capturing start portion is operated while the image capturing apparatus is not on standby for image capturing, the image sensor moves from the second movable area to the first movable area, and the optical member and the vibration transmission member are shifted from a state of being in contact with each other to a state of not being in contact with each other.

9. The image capturing apparatus according to claim 1, wherein a rolling member is configured to move the movable portion in a direction orthogonal to the optical axis to perform the image blur correction, and is arranged at a position overlapping, in the optical axis direction, with a position at which the vibration transmission member is in contact with the optical member in a state where the optical member and the vibration transmission member are in contact with each other.

10. A method for an image capturing apparatus having a vibration device, a vibration transmission member, a housing to hold the vibration transmission member, a movable portion, and an optical member, the method comprising:
vibrating the image capturing apparatus by the vibration device to give a user a feeling corresponding to an operation performed by the user on an operation portion;
transmitting a vibration of the vibration device by the vibration transmission member; and
holding, by a movable portion, an image sensor that moves within a first movable area in a direction different from an optical axis to perform image blur correction,
wherein the optical member is arranged on an object side of the image sensor and on the optical axis,
wherein, while the image sensor is located in the first movable area, the optical member and the vibration transmission member are not in contact with each other, and
wherein, when the image sensor moves to a second movable area formed outside the first movable area, the optical member and the vibration transmission member are brought into contact with each other.

11. A non-transitory computer-readable storage medium storing a program to cause a computer to perform a method for an image capturing apparatus having a vibration device, a vibration transmission member, a housing to hold the vibration transmission member, a movable portion, and an optical member, the method comprising:
vibrating the image capturing apparatus by the vibration device to give a user a feeling corresponding to an operation performed by the user on an operation portion;
transmitting a vibration of the vibration device by the vibration transmission member; and
holding, by a movable portion, an image sensor that moves within a first movable area in a direction different from an optical axis to perform image blur correction,
wherein the optical member is arranged on an object side of the image sensor and on the optical axis,
wherein, while the image sensor is located in the first movable area, the optical member and the vibration transmission member are not in contact with each other, and
wherein, when the image sensor moves to a second movable area formed outside the first movable area, the optical member and the vibration transmission member are brought into contact with each other.

* * * * *